United States Patent [19]
Stewart et al.

[11] Patent Number: 6,067,017
[45] Date of Patent: May 23, 2000

[54] EMERGENCY LOCATION SYSTEM AND METHOD

[75] Inventors: Arthur L. Stewart, Melbourne Beach; Brian P. Holt, Melbourne, both of Fla.

[73] Assignee: Harris Corporation, Melbourne, Fla.

[21] Appl. No.: 08/694,412

[22] Filed: Aug. 12, 1996

[51] Int. Cl.$^7$ ................................................ G08B 23/00
[52] U.S. Cl. .................. 340/573.1; 340/539; 455/100; 455/575; 379/37
[58] Field of Search .................................. 340/573, 574, 340/539; 455/100, 404, 556, 557, 558, 575, 343, 572; 379/37, 38, 39; 381/42

[56] References Cited

U.S. PATENT DOCUMENTS 4,903,326  2/1990  Zakman et al. .................. 455/575

*Primary Examiner*—Daniel J. Wu
*Assistant Examiner*—Anh La
*Attorney, Agent, or Firm*—Rogers & Killeen

[57] ABSTRACT

An emergency location system and method for determining the location of a caller sending an emergency signal without utilizing the bandwidth of the calling system. The system may be readily attached to existing telephone, radio-telephone and similar communicating devices through existing detachable battery packs. Detection of the need to send the locating signal may be based on automatic detection of a predetermined dialing sequence or through a dedicated switch (i.e., a "panic switch") or both.

19 Claims, 2 Drawing Sheets

EMERGENCY LOCATION SYSTEM AND METHOD

BACKGROUND OF THE INVENTION

The present application is directed, in general, to systems and methods for locating and/or communicating with mobile personnel and, in particular, to a system and method for integrating locating/communicating devices into the existing wireless communications backbone.

To provide more efficient use of police, rescue and security forces, many telephone systems provide an indication of the address of the telephone subscriber placing a telephone call to obtain the assistance of such forces. The use of the address of the telephone subscriber provides many advantages including the efficient, and often direct, routing of emergency telephone calls to the proper political subdivision serving the geographic location of the calling person and the reduction of the number of false alarms and crank calls. Of significant additional benefit to rescue and similar emergency personnel is the fact that the use of such locating systems in the telephone network provide the address of a caller who, because of physical impairment or the proximity of unfriendly personnel, may not be able to speak to the emergency services dispatcher. There are many recorded instances in which a person who was unable to speak, for example because the occurrence of a debilitating stroke, has been saved by the fact that the emergency personnel were provided by the telephone network with an indication of the location of the person needing assistance.

Generally, in prior art systems, the ability to provide location information to emergency personnel was limited to those calls made from land-based telephones, as contrasted with wireless telephones. Generally, integrated into the fixed telephone network is a one-to-one correspondence between the location of a telephone and its telephone number. The emergency service systems took advantage of that correspondence to identify the location of a telephone to emergency personnel from the preexisting ability of the telephone network to identify the telephone number (or source) of a telephone call. With the use of wireless systems, however, the one-to-one correspondence between a telephone instrument's location and its telephone number is no longer valid as the wireless telephone may be wandering anywhere within the radiating range of the wireless system and be able to place telephone calls, including emergency calls.

To provide emergency personnel responding to emergency calls received from wireless telephones, systems have been proposed which would locate the user of the wireless telephone through one method or another and provide such location information. Often such location methods use the fact that the wireless telephone is a radiating instrument and use various receiving devices to triangulate on the radiation emanating from the wireless telephone. Usually, in such locating systems, the locating system must interpret the signals used in the wireless system to identify the telephone making the emergency call. The locating systems then generally geolocate using a triangulation scheme based upon the receipt of the signal from the mobile instrument at several of the landbased receivers within a particular wireless system.

Present systems which geolocate on the radiated communication signal from a mobile communication device have several limitations. First, because the locating system must identify the mobile device from the communicated signal and each type of wireless system has a particular and unique format and protocol, such locating systems generally work with only one of the many different wireless systems presently installed. For example, a locating system which geolocated based on the communicated signal from a present day cellular telephone device would not be able to receive the signals from former mobile telephone systems still in use, such as the AMPS system, existing pager systems, SMR systems. Similarly, such locating systems would not be able to locate users using other systems such as the Marine mobile systems, the citizens band radio system, and other non-cellular systems. Further aggravating the problem for locating systems is the fact that presently there are many new wireless systems coming on-line (digital cellular systems, Personal Communications Systems, etc.) which the locating system will not be able to accommodate without the addition of substantial additional equipment to receive and decode the uniquely formatted and encoded signals from such new systems.

Further exacerbating the problems of locating persons within the many existing and soon-to-exist types of wireless systems is the fact that many of the systems are owned by or controlled by different entities, requiring considerable coordination in a commercially competitive arena which is often quite difficult to obtain.

Already there is a substantial installed base of mobile communications equipment, including mobile telephones and cellular telephones. To provide a emergency location system associated with the installed base could require the modification of most of the existing equipment, at a cost which both consumers and service providers would rather avoid. Consequently, any system to be developed to provide such locating capability should be readily integrable with the installed base along with being readily adapted with mobile communicating devices now and soon to become available.

Accordingly, it is an object of the present invention to provide a novel system and method for geolocating mobile communications devices without the need for extensive retrofitting of the installed base of such devices.

It is another object of the present invention to provide a novel system and method for geolocating mobile communications devices without impacting on the ability of the communications system to handle normal message traffic.

It is yet another object of the present invention to provide a novel system and method for geolocating mobile communications devices which can be automatically activated.

It is still another object of the present invention to provide a novel system and method for geolocating mobile communications devices which may be integrated into the plurality of different mobile communications systems presently and soon to be in existence.

It is a further object of the present invention to provide a novel system and method of geolocating mobile communications devices which have sufficient geolocating accuracy to identify the location of the user.

It is yet a further object of the present invention to provide a novel device for use in a geolocating mobile communications system wherein the device is relatively simple to manufacture and readily installed into a mobile communications environment.

It is still a further object of the present invention to provide a novel system and method for geolocating mobile communications units which obviates these and other difficulties experienced in present systems.

These and many other objects and advantages of the present invention will be readily apparent to one skilled in the art to which the invention pertains from a perusal of the

DESCRIPTION OF PREFERRED EMBODIMENTS

Figure 1:
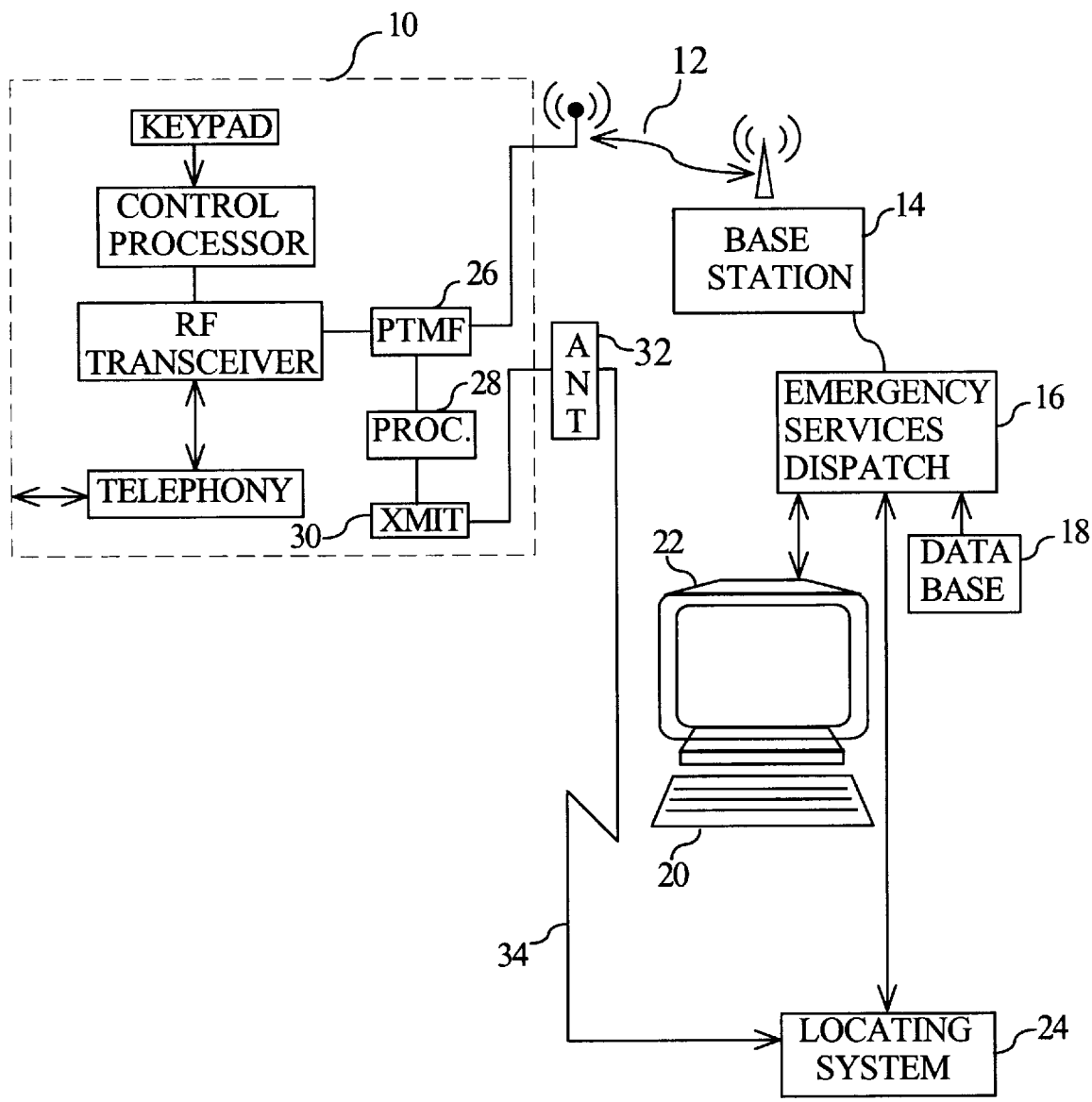
FIG. 1 is a simplified functional block diagram showing one embodiment of the system of the present invention.

With reference to FIG. 1, an embodiment of the present invention may be used with a conventional cellular telephone system. The system includes a cellular telephone 10 which communicates via a RF link 12 using a standard protocol with a telephone base station 14. The base station 14 may provide conventional telephony switching of calls destined for or received from the cellular telephone 10. The other person or persons involved in the telephone call may be telephone units using the conventional "hard-wired" telephone network or other users of cellular telephones.

Calls received from the cellular telephone 10 and identified as emergency calls may be routed by the base station 14 (or the central cellular switching site, not shown) to an emergency services dispatcher 16. These calls can be identified by their use of a standard emergency code, such as 9-1-1, or by their use of a telephone number recognized by the base station 14 as being associated with an emergency service. In conventional fashion information regarding the subscriber (but not the subscriber's location) may be obtained from a data base 18, such as a disk storage unit available at the emergency services dispatcher 16. The telephone call and the information obtained from the data base 18 may be passed to a workstation 20 at which the information from the data base may be displayed on a display 22 and the voice telephone call may be switched to a workstation user's telephone headset (not shown).

With continued reference to FIG. 1, information regarding the geolocation of the cellular telephone 10 may be provided by the cellular telephone 10 through an independent communication link 34 to a locating system 24. Once the locating system has located a desired cellular telephone 10, that location may be provided to the emergency services dispatcher 16. Alternatively, the location information may be used by a processing unit (such as but not limited to the base station 14) which determines to which geopolitical subdivision the telephone call should be routed based on the location of the person requesting emergency services.

The geolocation information may be provided by the cellular by transmitting a locating beacon which the locating system may geolocate as to its source. Generally, the locating beacon should provide identifying information to identify the cellular telephone 10 from which it is being transmitted. The locating system 24 in response to a request from the emergency services dispatcher 16 may selectively receive and decode available locating beacons and identify the location of the requested cellular telephone 10 from its identifying information.

Many different and conventional beacon systems may be used, using any one of the many known communications protocols such as Aloha, slotted aloha, PCM, etc. which permit the sending unit to identify itself. Alternatively, the beacon system may use the system disclosed in co-pending patent application Ser. No. 08/708,301, filed Aug. 30, 1996, entitled "A System and Method for Monitoring and Locating Plural Mobile Units", invented by Jim Otto and assigned to the same assignee as the present application, which is incorporated herein by reference.

The initiation of the beacon sending sequence by the cellular telephone 10 may use a DTMF (Dual Tone MultiFrequency) decoder 26 to monitor and trap the transmission of a known emergency code. For example, the DTMF decoder 26 may be set to detect the successive digits 9-1-1, a standard emergency telephone number in most parts of the United States. The DTMF decoder 26 can be under the control of and provide the initiating signal to a microprocessor 28. The microprocessor 28 should ensure that the emergency digits are placed correctly in the dialing sequence so that the dialing of an emergency number (as opposed to a dialing of a standard telephone unit which happens to contain the emergency number sequence embedded within a longer dialing sequence). For example, the digits 9-1-1 dialed anywhere other than the first digits of a dialing sequence do not signal the initiation of emergency dialing. Upon the decoding by the microprocessor 28 of the correct emergency dialing sequence, the microprocessor 28 may turn on a beacon transmitter 30 which develops a beacon signal and transmits it through an antenna 32.

In an alternative embodiment, the beacon signal may be initiated by the closure of a switch located arbitrarily on the outer surface of the cellular telephone 10. The switch should be placed where readily accessible by the user, yet be resistant to accidental/inadvertent initiation. Further, the switch may cause both the initiation of the beacon signal and may cause the telephony portion of the cellular telephone 10 to dial the emergency service number associated with a particular region. In this way, the switch can serve as a type of "panic switch" which is readily carried (and somewhat concealed) on a conventionally-appearing cellular telephone.

In still another embodiment, the beacon signal may be initiated by the detection of the emergency dialing signals by a passive device such as a inductive pick-up placed somewhere near the radiating portions of the cellular telephone 10 or other irradiating device. As in the case of the DTMF decoder 26, the inductive pick-up should be controlled to initiate the beacon signal only upon the detection of the dialing sequence within a proper framework.

In yet other embodiments, the beacon signal may be initiated by the detection of the proper dialing sequence by detecting equipment placed appropriately on, in or near the cellular telephone 10 or other communicating device. For example, in modern cellular telephones, it is known to provide the telephone signal (and sometimes a data signal) to a port to which an external device (such as a loudspeaker/microphone or automatic dialer may be attached). Because this port may already be provided with the dialing sequence, a suitable detection device and control logic may be placed in association therewith to reliable detect the dialing of the emergency number.

Figure 2:
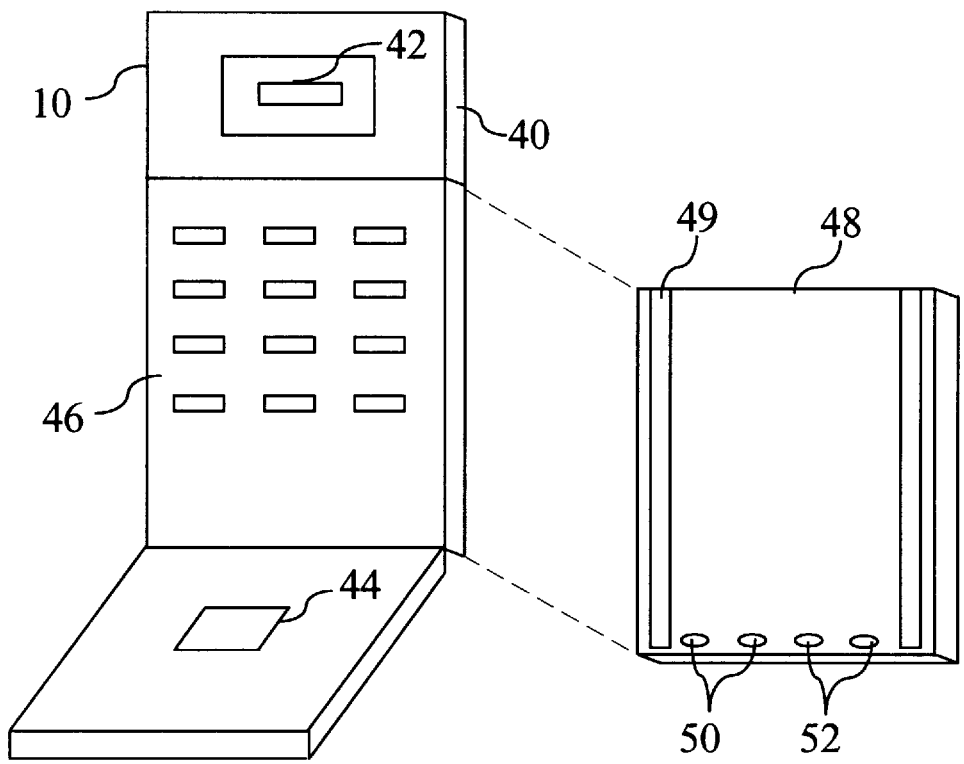
FIG. 2 is a pictorial view of an embodiment of the present invention.

With reference now to FIG. 2, a cellular telephone 10 used in the present invention may have a conventional housing 40 which integrates a speaker 42, microphone 44, and keypad 46. As is well known, such telephones may be powered by removable battery packs which provide portable power to the electronic circuits of the cellular telephone 10 via battery connectors (power and reference) 50. The battery connectors 50 are placed on the battery pack such that when the pack is removably affixed to the cellular telephone 10, the battery connectors 50 cooperate with power pins or similar devices in the cellular telephone to provide the electrical power from the battery pack 48 to the circuits of the cellular telephone 10. The power pack may also include data port access points 52, which (as mentioned above) may carry telephony, dialing and/or data signals to and from the cellular telephone 10 to external or piggyback devices (not shown). As is well known, the battery pack may be readily attached and/or detached through the use of cooperating rails 49 which mate with a rail receiving structure on the instrument. The attachment may readily be made by any other conventional means, including without limitation, tabs, detents, etc.

Generally, in many present cellular telephone systems, the battery pack 48 is readily disconnected from the cellular telephone 10 so that it may be recharged while a second (or more) fresh battery packs 48 are sequentially removably affixed to the cellular telephone 10. In this way, the telephone 10 may continue to be used while the spent battery packs 48 are being recharged.

Figure 3:
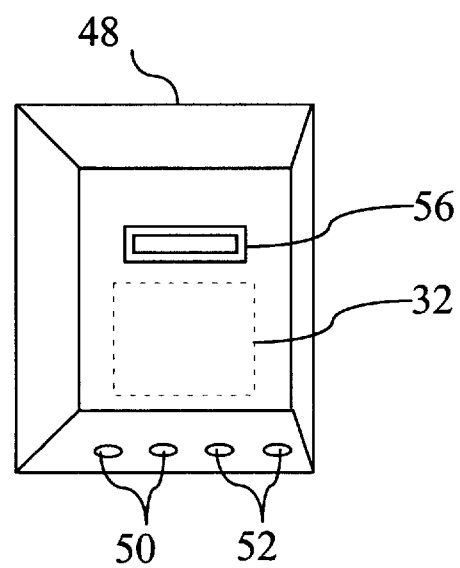
FIG. 3 is a pictorial view of another embodiment of the present invention.

With reference now to FIG. 3, an embodiment of the present invention may include a battery pack which includes not only the rechargeable battery but a simplified beacon signal transmitter 30 and antenna 32. The beacon signal transmitter 30 may receive power from the battery pack to which it is attached by connecting to the electrical connectors 50. Alternatively, the connection between the beacon transmitter 30 and the battery power may operate through a switch which isolates the beacon transmitter 30 from the battery power until the emergency dialing sequence has been detected.

With continued reference to FIG. 3, the antenna 32 may be connected to the beacon transmitter 30 and may include a patch antenna which is attached to the interior surface of the battery pack. An antenna in the form of a patch may be particularly useful as a radiating device for a locating system and occupies little room within the space critical battery pack housing.

The beacon transmitter 30 may receive signals through the conventional data ports 52 which can be decoded to determine whether a dialing sequence of an emergency telephone number has been entered, as described above. Alternatively, the beacon transmitter 30 may be caused to transmit by the closure of a switch appropriately placed 56, for example, on the outer surface of the battery pack 48 or the cellular telephone 10. Because the beacon transmitter 30 may have access to the data ports 52, the beacon transmitter 30 may send appropriate signals to the logic of the cellular telephone 10 to cause it to dial the designated emergency telephone number upon the closure of the panic switch. Note that with the use of a transmitter in the battery pack 48, the capability to geolocate cellular telephones may readily be retrofit into the existing base of cellular telephones. No modifications are needed to the cellular telephone 10. Because rechargeable batteries generally have a limited life, it can be expected that battery packs will be replaced periodically in the normal usage of a cellular telephone and battery packs having the geolocation capability of the present invention may readily be substituted at the replacement time for the present, conventional battery packs.

In one aspect of the present invention, the use of the crowded cellular telephone frequencies is avoided. Thus, use of the present invention need not tie up or use the available bandwidth of the cellular system. In still another aspect of the present invention, the battery pack system may readily be adapted to the battery packs of different types of systems, including AMPS, TDMA, PCS, etc. By using the same type of locating system of the present invention in varying communications systems, the need for redundant locating systems to service all of the mobile communication systems is avoided and a single, integrated locating system may be obtained for efficient interconnection with the emergency telephone and dispatch systems.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. An emergency location system operable in conjunction with a public communication system comprising:

central means for detecting an alerting signal;

locating means responsive to the detection of an alerting signal by said central means for geolocating the source of said alerting signal; and, alerting signal generating means, comprising:

a battery-powered, hand-held device for communicating on a public communication system;

a battery pack for powering said device for communicating, said battery pack being removable from said device;

alerting signal transmitting means carried within said battery pack for communicating an alerting signal;

alerting signal control means for initiating said alerting signal transmitting means;

whereby the user of the device for communicating may selectively send an alerting signal for receipt by said central means to indicate the presence of an emergency condition affecting the user.

2. The system of claim 1 wherein said alerting signal uses a frequency other than the frequencies used by said public communication system.

3. The system of claim 1 wherein said alerting signal control means comprises means to monitor the signals sent by the user on the public communication system to detect the transmission of a predetermined emergency dialing sequence thereon.

4. The system of claim 1 wherein said alerting signal control means comprises manual switch means carried by said battery pack.

5. The system of claim 2 wherein said alerting signal control means further comprises manual switch means carried by said battery pack.

6. The system of claim 1 wherein said alerting signal control means comprises data port detection means whereby emergency dialing sequences input by the user are detected by the alerting signal control means on a data port associated with said device for communicating.

7. The system of claim 1 wherein said alerting signal transmitting means comprises a single semiconductor chip and an antenna.

8. The system of claim 7 wherein said antenna comprises a patch antenna.

9. The system of claim 8 wherein said patch antenna is affixed to a surface within the interior of the housing of the battery pack.

10. The system of claim 1 further comprising:

notification means for notifying the public communication system of the geolocation of the source of the alerting signal;

association means for associating an emergency call on the public communication system with the geolocation of the user sending an alerting signal.

11. The system of claim 10 wherein said system operates in conjunction with plural public communication systems.

12. The system of claim 11 wherein said association means associates an emergency call on one of said plural communications systems with the geolocation of the user sending an alerting signal.

13. In a hand-held, battery powered device for communicating on a public communication system, said device comprising a keypad, a voice transmission circuit, control logic for operating said voice transmission circuit in accordance with a predetermined communications protocol, and a removable, battery pack for powering said device, the improvement comprising an emergency beacon transmitter affixed to said battery pack.

14. The communicating device of claim 13 further comprising a manual switch carried on said battery pack and operatively connected to said emergency beacon transmitter for causing said transmitter to transmit an alerting signal.

15. The communicating device of claim 13 further comprising means for causing said emergency beacon transmitter to transmit an alerting signal.

16. The communicating device of claim 15 wherein said means for causing comprises a detection circuit for detecting an emergency signal sent by the user of the device within said communications protocol.

17. The communicating device of claim 16 wherein said alerting signal is transmitted using a different protocol from said communications protocol.

18. A hand-held, battery powered device for communicating on a public communication system, said device comprising a keypad, a voice transmission circuit, control logic for operating said voice transmission circuit in accordance with a predetermined communications protocol, a removably attached battery pack, and a beacon transmitter affixed to said battery pack so that said device may be used to transmit an alerting signal from an antenna of said attached battery pack.

19. A hand-held, battery powered device for communicating on a public communication system, said device comprising a keypad, a voice transmission circuit, control logic for operating said voice transmission circuit in accordance with a predetermined communications protocol; a removable battery pack, and an emergency beacon transmitter and an antenna affixed to said battery pack so that said battery pack may be used to transmit an alerting signal from the antenna.

* * * * *